Aug. 27, 1968  A. BURGERT ET AL  3,399,338
LOW VOLTAGE PROTECTION FOR A REGULATED POWER SUPPLY
Filed Oct. 22, 1965

INVENTORS
ALBERT BURGERT
GUY ARZUL
BY *Paul M. Craig, Jr.*
ATTORNEY

United States Patent Office 3,399,338
Patented Aug. 27, 1968

3,399,338
LOW VOLTAGE PROTECTION FOR A
REGULATED POWER SUPPLY
Albert Burgert, Arcueil, and Guy Arzul, Pleubian, France, assignors to Compagnie Generale d'Electricite, Paris, France
Filed Oct. 22, 1965, Ser. No. 501,705
Claims priority, application France, Feb. 8, 1965, 4,743
10 Claims. (Cl. 323—9)

ABSTRACT OF THE DISCLOSURE

A voltage regulating current limiting circuit including a regulating transistor controlled by a differential amplifier responsive to a reference voltage and the load voltage, and including a passive impedance connecting the output of the regulating transistor with the input of the differential amplifier for regulating the reference voltage for low values of the load voltage to reduce the current through the regulator transistor.

---

The present invention relates to a circuit for ensuring the protection of the regulator transistor of a direct voltage regulating current limiting circuit.

In conventional circuits of the character described above the variation of a direct voltage to be regulated is compensated by inverse variation of the inner resistance of a regulator transistor. Thus, the current of this transistor, flowing through a load, is limited to a given value and the voltage is stabilized. However, the load may be subjected to sudden variations due for example to some accidental short-circuit and the current taking its maximum value may destroy the regulator transistor because the voltage drop in the transistor increases when the load decreases. Since the particular transistors normally used as regulator transistors are expensive, it is important to provide automatic means for regulating the current of the transistor when the output voltage drops below a given value.

Heretofore this problem has been solved by the use of relays of various types or by use of electronic circuits including tubes or transistors. The disadvantage of circuits having electromechanical relays is obvious and therefore the electronic circuits are generally preferred. However, more or less complicated electronic circuits are expensive and active elements are less reliable than passive elements.

In one of the electronic set ups of the prior art, comprising a transistor for the purpose of transmitting the incidental variations of the voltage appearing on a load, said transmission takes place through a diode, resulting in an effective protection against overcurrent only if the characteristics of both solid state devices comply with relatively strictly defined conditions which may not be indefinitely satisfied in view of ageing of the device.

Therefore, the object of the present invention is to provide simple, inexpensive but effective means for the protection of the regulator transistors.

Another object of the invention is to provide means for the protection of the regulator transistors using only passive elements.

A still another object of the invention is to provide means for the protection of the regulator transistors, easily adaptable to conventional circuits.

A further object of the invention is to provide an improved reliable circuit capable not only of regulating a direct voltage and limiting the current flowing through a load but also capable of regulating this current in case of accidental drop of value of the load.

The circuit of the invention and its operation will now be described by way of example with reference to the attached drawings wherein.

Figure 1:
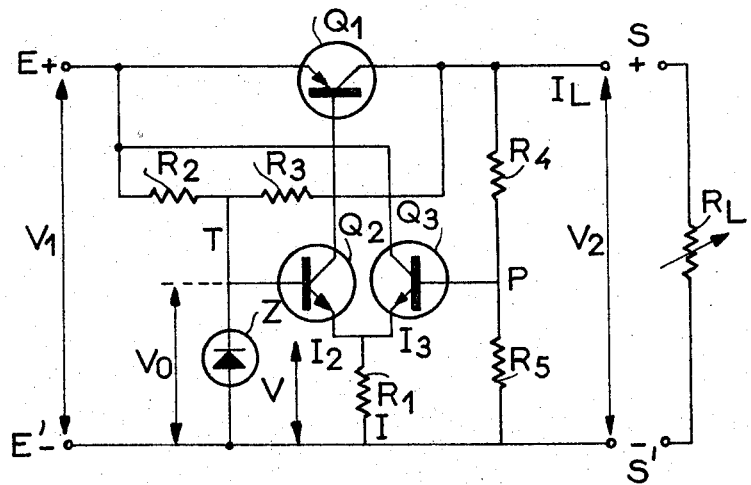
FIGURE 1 shows a conventional circuit modified according to the invention.

As shown in FIGURE 1 the voltage regulated power supply of the invention comprises a regulator transistor $Q_1$ controlled by two transistors $Q_2$ and $Q_3$ which are connected as a differential amplifier having a common emitter resistor $R_1$ connected to ground.

The collector of transistor $Q_2$ is connected with the base of transistor $Q_1$ whereas the collector of transistor $Q_3$ is connected to the emitter $Q_1$. The base of $Q_3$ is connected to a midtap P of a first voltage divider formed by resistors $R_4$ and $R_5$, the free ends of $R_4$ and $R_5$ being connected with the collector of $Q_1$ and with the ground, respectively. Similarly, the base of transistor $Q_2$ is connected to a mid-point T of a second voltage divider formed by a resistor $R_2$ connected in series with a Zener diode or any equivalent voltage stabilizing element Z; the free end of $R_2$ is connected with the emitter of the regulator transistor $Q_1$ and the free terminal (anode) of the diode Z is connected to ground.

The output voltage $V_2$ is supplied at the terminals SS of the above mentioned first voltage divider through regulator transistor $Q_1$ while the input voltage $V_1$ is supplied to the input terminals EE' of the second voltage divider.

A resistance $R_L$ schematically represents the load to be connected to the output termianls SS'.

The input terminals EE' are connected to a conventional direct voltage source (not shown in the drawings) operable to supply the direct voltage to be regulated.

The voltage regulated power supply further comprises a resistor $R_3$ connecting the collector of the regulator transistor $Q_1$ with the midpoint T of the second voltage divider; the provision of such a connection is new and constitutes the main feature of the present invention as will be shown hereinafter.

Under normal conditions, the power supply of the invention operates as follows: when transistors $Q_1$, $Q_2$ and $Q_3$ are in the "passing" or conducting state, the voltage drop V across resistor $R_1$ is equal to the reference voltage drop $V_o$ across the Zener diode Z less the voltage value $V_{be}$ corresponding to the voltage drop between the base and the emitter of transistor $Q_2$. The current I, passing through resistor $R_1$ is therefore equal to the sum of the currents $I_2$ and $I_3$ passing through transistors $Q_2$ and $Q_3$, respectively:

$$I = I_2 + I_3 = \frac{V}{R_1} = \frac{V_o - V_{be}}{R_1}$$

As long as transistor $Q_2$ is not blocked, the variation of $V_{be}$ is not very important, $V_{be}$ being equal to a relatively small fraction of the voltage $V_o$; I is therefore substantially constant under normal conditions and, owing to the stabilizing property of the circuit, the voltage of the midtap P is substantially equal to $V_o$, the stabilized output voltage $V_2$ being substantially equal to $$V_o \frac{R_4 + R_5}{R_5}$$

Figure 2:
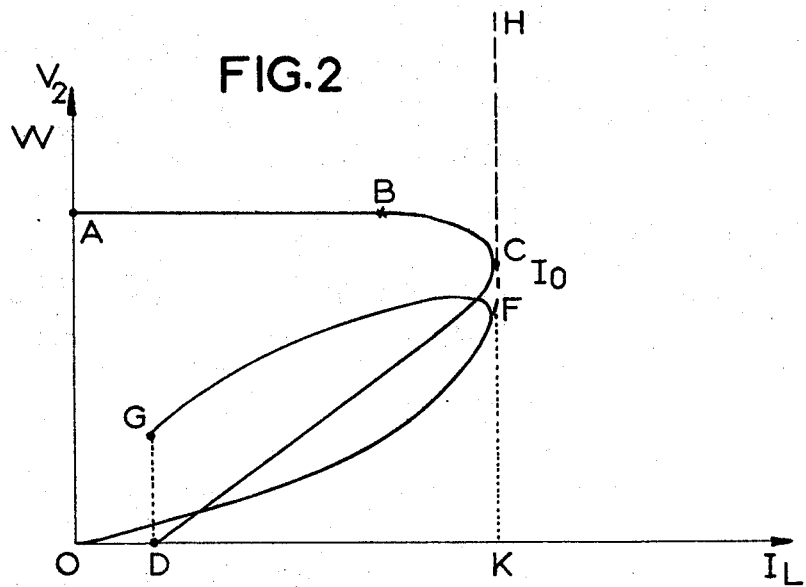
FIGURE 2 shows the characteristic curve of the circuit of the invention compared to those of the conventional circuit.

The operation of the circuit as modified by the resistor $R_3$ will now be described with reference to FIGURE 2 showing two curves respectively representing the output voltage $V_2$ and the energy W dissipated in the transistor $Q_1$ versus the current $I_L$ flowing through the variable load $R_L$.

The variation of $V_2$ is represented by the curve ABCK in the case of a circuit without the resistor $R_3$ and the curve ABCD for a circuit having the connection resistor $R_3$.

Similarly the variation of W is represented by the curve OFH in the first case (absence of $R_3$) and by the curve OFG in the second case (with resistor $R_3$ connected).

The parameter $R_L$ is represented in FIGURE 2 by a current or operating point running along the above-mentioned curves, each position of the operating point corresponding to a given value of $I_L$ and $V_2$ or W, respectively.

When the operating point is at A, $R_L = \infty$ (open load circuit), the current flowing through $R_L$ is equal to zero. If $R_L$ decreases, the operating point shifts from A toward B and as long as the transistor $Q_3$ is in the conducting state the voltage $V_2$ remains substantially constant.

If $R_L$ keeps on decreasing after the operating point passes B, the regulation of the voltage is no longer satisfactory because the output voltage $V_2$ starts decreasing and the transistor, as a result, approaches the condition of being blocked. When the operating point reaches C, transistor $Q_3$ is blocked due to the reduction of the voltage drop at P and the current $I_2$, flowing through $Q_2$ (and equal to the base current of $Q_1$) reaches its maximum value due to saturation of $Q_2$ $$I_2 \text{ Max.} = \frac{V_o - V_{be}}{R_1}$$

the current flowing through $Q_1$ being then maximum and equal to $$I_o = b I_2 \text{ Max.}$$

where "b" is the amplification coefficient of $Q_1$.

If the load $R_L$ keeps on decreasing, in the absence of the resistor $R_3$ the current flowing through $Q_1$ remains equal to $I_o$ the voltage $V_2$ decreasing: the operating point will thence run along the portion CK of the curve ($I_L = I_o$).

The voltage drop $V_1 - V_2$ in the transistor $Q_1$ increases since the value of $V_2$ decreases and the energy dissipated in the transistor being proportional to $(V_1 - V_2)^2$ increases rapidly.

This is shown by the curve representing W; the increase of W is substantially linear at the beginning of the portion OF then becomes very critical when the operating point passes the point F corresponding to the blocking of the transistor $Q_3$. The current $I_o$ remaining constant, the operating point follows the substantially vertical portion FH, which shows that under these conditions the transistor will be shortly damaged, if not destroyed.

According to the present invention the collector of $Q_1$ is connected with the point T through a resistor $R_3$. As shown above, when the load $R_L$ decreases and for a certain value of $V_2$ the total current flowing through Z is reduced until it passes below the breakdown value of the diode and is no longer sufficient to maintain the constant reference voltage $V_o$.

Therefore, the voltage at T decreases, reducing the current $I_2$ flowing through $Q_2$ thus causing a decrease of the base current $Q_1$; hence a decrease of the current $I_L$ occurs which is equal to $bI_2$, "b" being the amplification coefficient of $Q_1$.

This is shown in FIGURE 2 where the operating point instead of following the above-mentioned portion of curve CK keeps on running along the portion CD. Similarly, on the curve representing the power or heat dissipation in the transistor $Q_1$, the operating point passes the point F and runs along the portion FG instead of following the portion FH.

With appropriate values of the parameters of the circuit of the invention, the connection of the collector of $Q_1$ with the base of the transistor $Q_2$ makes it possible to avoid any damage to the transistor $Q_1$ by reducing the energy dissipated in this transistor in case of any accidental decrease of the load.

Thus an extremely but unobvious means makes it possible to obtain a very inexpensive but reliable protection of the regulator transistor.

While we have shown and described several embodiments in accordance with the present invention, it is understood that the same is not limited thereto but is susceptible of numerous changes and modifications as known to a person skilled in the art, and we, therefore do not wish to be limited to the details shown and described herein, but intend to cover all such changes and modifications as are encompassed by the scope of the appended claims.

We claim:

1. In a voltage regulating current limiting circuit of the type having a regulator transistor regulating the current to a load under control of a differential amplifier having one input connected to a source of voltage and another input connected to means providing a measure of the load voltage, said source being operable to supply a reference voltage in dependance on the current flowing through said differential amplifier, said reference voltage being substantially constant for the currents above a given threshold value, the improvement essentially consisting of the provision of a protecting circuit for protecting the regulator transistor, comprising passive impedance means connected between the output terminal of said regulator transistor and said input of said differential amplifier for adjusting said reference voltage at low levels of load voltage, a decrease of the voltage at said output terminal of the transistor causing a decrease of the reference voltage thereby reducing drastically the current of said regulator transistor.

2. In a voltage regulating and current limiting circuit comprising a regulator transistor, a controllable source of voltage including a Zener diode for supplying a reference voltage, a differential transistorized amplifier having an output connected with the base of said regulator transistor and an input connected with said Zener diode and operable to control the current of said transistor in response to the value of said reference voltage compared to the value of the output voltage of said regulator transistor, the improvement essentially consisting of control means for controlling said source of voltage comprising passive impedance means connecting the collector of said transistor with said input of said differential amplifier for adjusting said reference voltage at low levels of output voltage of said regulator transistor, a decrease of the voltage at said collector below a predetermined value reducing the current flowing through said Zener diode thereby reducing the current flowing through said transistor.

3. A voltage regulating and current limiting circuit comprising, a regulator transistor supplied with a voltage to be regulated, amplifier means connected with the base of said transistor for controlling the current of said transistor, a reference voltage source including a Zener diode connected with the input of said amplifier means and passive impedance means connecting the output terminal of said transistor and the input of said amplifier means, the value of said passive impedance means being such that upon the passage of the voltage at the output of the transistor below a predetermined value, the current flowing through said Zener diode passes below the breakdown value thus decreasing the voltage of the input of said amplifier means.

4. A voltage regulating, current limiting and regulating circuit comprising a regulator transistor having an emitter constituting an input terminal and a collector constituting an output terminal, a differential amplifier including first and second transistors connected in parallel having a common emitter resistor connected with the ground, the collector of said first transistor being connected with the base of said regulator transistor, the collector of said transistor being connected with the emitter of said regulator transistor, a first voltage divider comprising in series connection a first resistor and a Zener diode, the junction of the resistor and the cathode of the diode being connected with the base of said first transistor, a second voltage divider connected between the ground and the collector of the regulator transistor and having a mid-tap connected with the base of said second transistor, and resistance means connected between the collector of said regulator transistor and the cathode of said Zener diode, values of said first resistor and said resistance means being such that the current flowing through said Zener diode passes below the breakdown value of the diode for the maximum value of the current flowing through the regulator transistor.

5. In a voltage regulating and current limiting circuit including a regulator transistor, a voltage source connected to the emitter of said regulator transistor, the collector of said transistor serving as the output of said circuit, voltage divider means connected to said voltage source for supplying a reference voltage, differential amplifier means having an output connected to said base of said regulator transistor, a first input connected to said reference voltage and a second input connected to means providing a measure of the output voltage of said circuit for controlling said regulator transistor, the improvement essentially consisting of control means for controlling said reference voltage comprising passive impedance means connecting the collector of said transistor with the input of said differential amplifier for reducing said reference voltage in response to a decrease in the voltage at the collector of said transistor below a predetermined value.

6. A voltage regulating and current limiting circuit as defined in claim 5 wherein said voltage divider means includes a first resistor and a Zener diode in series connected across said voltage source.

7. A voltage regulating and current limiting circuit as defined in claim 6 wherein said means providing a measure of the output voltage includes additional voltage divider means including second and third resistors in series connected across the output of said circuit, the midpoint between said second and third resistors being connected to said second input of said differential amplifier.

8. A voltage regulating and current limiting circuit as defined in claim 7 wherein said differential amplifier means includes first and second transistors having the emitters connected through a fourth resistor to ground, the collector of said first transistor being connected to the base of said regulator transistor and the collector of said second transistor being connected to the emitter of said regulator transistor.

9. A voltage regulating and current limiting circuit as defined in claim 5 wherein said passive impedance means consists of a resistor connected between the collector of said regulator transistor and the base of said first transistor.

10. A voltage regulating and current limiting circuit as defined in claim 9 wherein the base of said first transistor is connected to the point of connection of said first resistor and said Zener diode, the base of said second transistor being the second input of said differential amplifier.

References Cited
UNITED STATES PATENTS

| | | | |
|---|---|---|---|
| 3,005,147 | 10/1961 | Thomas | 323—9 |
| 3,240,997 | 3/1966 | Burgi et al. | 323—22 X |
| 3,250,981 | 5/1966 | Marks | 323—22 |
| 3,321,698 | 5/1967 | Merkel | 323—22 X |

LEE T. HIX, *Primary Examiner.*

A. D. PELLINEN, *Assistant Examiner.*